(12) United States Patent
Sarferaz

(10) Patent No.: US 10,338,894 B2
(45) Date of Patent: Jul. 2, 2019

(54) GENERATING APPLICATIONS BASED ON DATA DEFINITION LANGUAGE (DDL) QUERY VIEW AND APPLICATION PAGE TEMPLATE

(71) Applicant: SAP SE, Walldorf (DE)

(72) Inventor: Siar Sarferaz, Heidelberg (DE)

(73) Assignee: SAP SE, Walldorf (DE)

( * ) Notice: Subject to any disclaimer, the term of this patent is extended or adjusted under 35 U.S.C. 154(b) by 263 days.

(21) Appl. No.: 15/144,799

(22) Filed: May 2, 2016

(65) Prior Publication Data
US 2017/0315784 A1 Nov. 2, 2017

(51) Int. Cl.
G06F 9/44 (2018.01)
G06F 8/34 (2018.01)
G06F 9/445 (2018.01)
G06F 16/248 (2019.01)

(52) U.S. Cl.
CPC ............ G06F 8/34 (2013.01); G06F 9/44505 (2013.01); G06F 16/248 (2019.01)

(58) Field of Classification Search
CPC ............................................. G06F 8/00–8/71
USPC .................................................. 717/100–178
See application file for complete search history.

(56) References Cited

U.S. PATENT DOCUMENTS

| | | | | |
|---|---|---|---|---|
| 5,566,330 | A * | 10/1996 | Sheffield | G06F 17/30398 |
| 8,862,984 | B1 * | 10/2014 | Thakare | G06F 8/75 715/234 |
| 2003/0051001 | A1 * | 3/2003 | Calvo | G06F 17/30893 709/218 |
| 2003/0120711 | A1 * | 6/2003 | Katz | G06F 8/34 718/106 |
| 2004/0073565 | A1 * | 4/2004 | Kaufman | G06F 17/30572 |
| 2007/0157159 | A1 * | 7/2007 | Fildebrandt | G06F 8/10 717/104 |
| 2009/0094577 | A1 * | 4/2009 | Fachat | G06F 8/35 717/106 |
| 2015/0112985 | A1 * | 4/2015 | Roggero | H04L 67/2823 707/736 |
| 2016/0306883 | A1 * | 10/2016 | Weller | G06F 17/30389 |
| 2017/0131974 | A1 * | 5/2017 | Balasubramanian | G06F 8/20 |
| 2017/0131975 | A1 * | 5/2017 | Balasubramanian | G06F 8/30 |

* cited by examiner

Primary Examiner — Jue Louie
(74) Attorney, Agent, or Firm — Fish & Richardson P.C.

(57) ABSTRACT

A method and system for generating an application has been described. A request is received to generate the application. Based on the received request, a Data Definition Language (DDL) query view defined for the application is executed to obtain a query view and a data transfer service. Next data is retrieved from the database based on the query view and the data transfer service. An application page template including a user interface (UI) related elements of the application is then generated based on the received request. The application page template and the retrieved data is then bound to generate a plurality of application pages of the application.

20 Claims, 11 Drawing Sheets

CostCenterPlanning

Creation: February 2nd 2015
Start Template: Planning

1 Configure — 2 Generate — 3 Launch

Project ID   CostCenterPlanning
Description  Customizing of the planning smart template for a specific scenario
Department   Controlling
Relevance    ★★★★☆ (4)

Service Information

| Source System | XXXXX | ERP_4711 |
| Query View 602 | Cost Center Plan Query 604 | CostCenterPlanQuery_Service 612 |
| Action | Save 606 | SavePlanValues_Service 614 |
| Action | Copy 608 | CopyActualValues_Service 616 |
| Action | Stimulate 610 | StimulatePlanValues_Service 618 |

Save

FIG. 6

| Account 902 | Description 904 | Total Actual 2016 906 | Total Plan 2016 910 | Difference 912 | Status 908 |
|---|---|---|---|---|---|
| ▼ SP-1000 | Sales & Presales | 112,897.99 EUR | 144,525.85 EUR | | open |
| SP-1100 | Salaries | 12,597.99 EUR | 11,625.35 EUR | | approved |
| SP-1200 | Travel | 2,293.94 EUR | 1,729.65 EUR | | rejected |
| SP-1300 | Office | 3,697.90 EUR | 2,225.85 EUR | | approved |
| ▼ SP-1400 | Demos | 12,597.99 EUR | 10,820.82 EUR | | approved |
| SP-1410 | Systems | 3,697.90 EUR | 11,625.35 EUR | | rejected |
| SP-1420 | Configuration | 3,697.90 EUR | 1,729.65 EUR | | open |
| SP-1430 | Presentation | 2,293.94 EUR | 2,225.85 EUR | | approved |
| ▼ SP-1400 | Marketing | 3,697.90 EUR | 10,820.82 EUR | | rejected |
| SP-1410 | Preparation | 3,697.90 EUR | 11,625.35 EUR | | approved |
| SP-1420 | Validation | 2,293.94 EUR | 10,820.82 EUR | | approved |
| SP-1430 | Campaign | 3,697.90 EUR | 1,729.65 EUR | | approved |
| ▼ SP-1500 | Prototyping | 12,597.99 EUR | 11,625.35 EUR | | open |
| SP-1510 | Hardware | 2,293.94 EUR | 2,225.85 EUR | | open |
| SP-1520 | Software | 3,697.90 EUR | 11,625.35 EUR | | approved |
| SP-1530 | Implementation | 2,293.94 EUR | 1,729.65 EUR | | approved |
| ▼ SP-1600 | Third Party | 3,697.90 EUR | 11,625.35 EUR | | open |
| SP-1610 | Consulting | 12,597.99 EUR | 2,225.85 EUR | | rejected |
| SP-1620 | Administration | 2,293.94 EUR | 11,625.35 EUR | | rejected |
| SP-1630 | Research | 2,293.94 EUR | 1,729.65 EUR | | approved |

FIG. 9

GENERATING APPLICATIONS BASED ON DATA DEFINITION LANGUAGE (DDL) QUERY VIEW AND APPLICATION PAGE TEMPLATE

BACKGROUND

The number of applications (apps) that are available for download has increased exponentially in the past decade. These applications or apps allow a user to perform particular task on a computer or any other electronic device. Typically an application generation process includes defining user interface related components that are displayed on the user interface and a data transfer service for retrieving application data from a data store.

With the wide spectrum of application types, from gaming applications to work related applications, different user interface related components and data transfer services need to be defined for generating different applications. This increases the time for generating each of these different application types. Further individually generating user interface related components for each of the application also leads to inconsistency in design of different applications.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. Various embodiments, together with their advantages, may be best understood from the following detailed description taken in conjunction with the accompanying drawings.

FIG. 6 illustrates an exemplary user interface to receive application configuration information for a cost center planning application, according to an embodiment.

FIG. 9 illustrates an exemplary user interface displaying details of the sales and presales cost center selected in FIG. 8, according to an embodiment

DETAILED DESCRIPTION

Embodiments of techniques for generating application based on DDL query view and application page template are described herein. In the following description, numerous specific details are set forth to provide a thorough understanding of the embodiments. A person of ordinary skill in the relevant art will recognize, however, that the embodiments can be practiced without one or more of the specific details, or with other methods, components, materials, etc. In some instances, well-known structures, materials, or operations are not shown or described in detail.

Reference throughout this specification to "hone embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Figure 1:
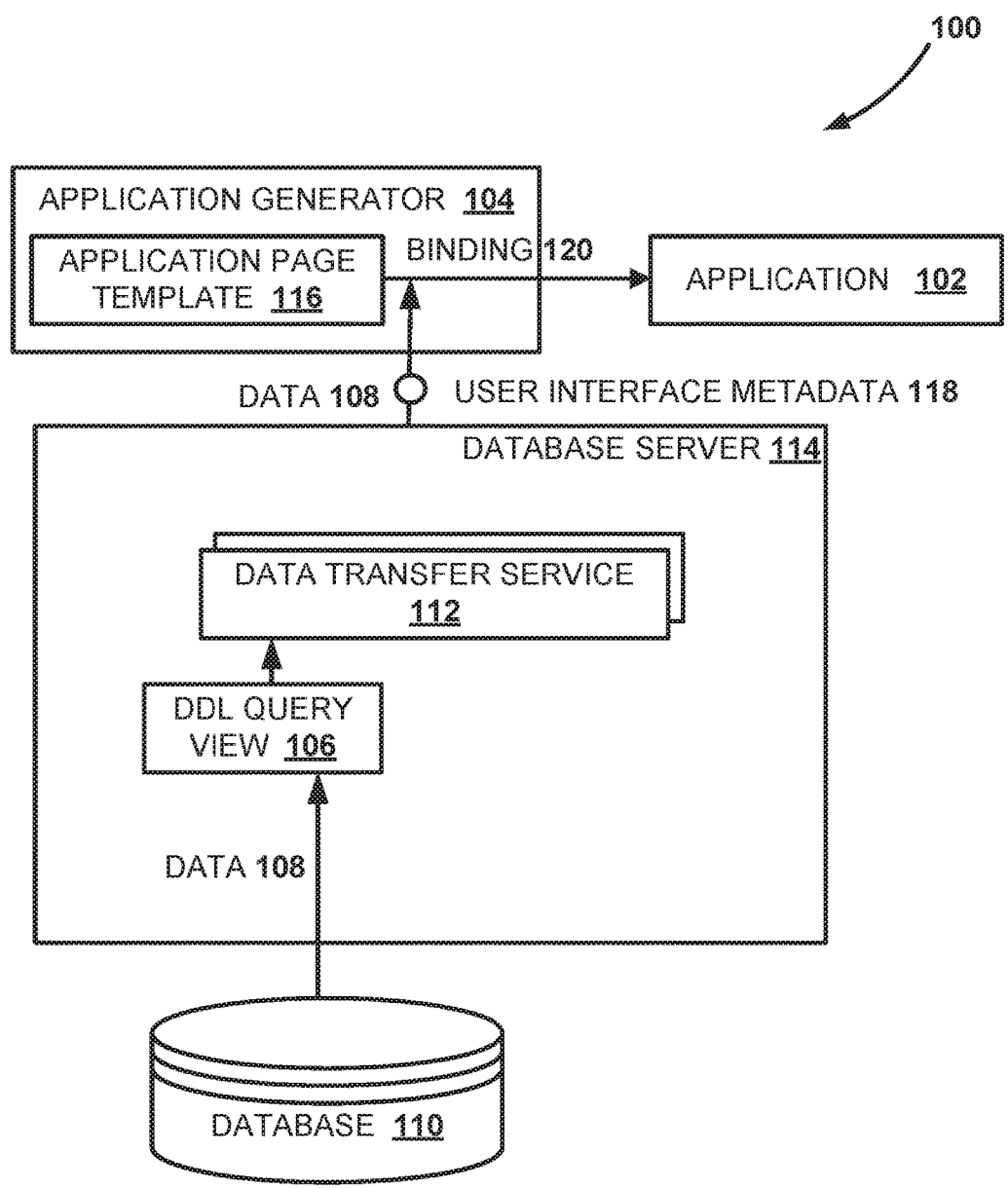
FIG. 1 is a block diagram illustrating a system to generate an application, according to an embodiment.

FIG. 1 is a block diagram illustrating a system 100 to generate an application 102, according to an embodiment. An application 102 or application software is a computer program designed to perform a group of coordinated functions, tasks, or activities. For example, an application may be a product-planning application designed to allow a user to plan delivery of a product based on several factors, for example, actual sales, predicted sales, etc.

To generate the application 102, initially an application generator 104 executes a Data Definition Language (DDL) query view 106 to retrieve data 108 stored in database 110. The DDL query view 106 may be received from a user in DDL syntax. DDL is a syntax that may be used to define the different database artifacts, for example, tables included in a data model of data stored in the database 110. A view is a result set, for example a virtual table, of a stored query in the database 110. A DDL query view 106 may include some of the fields included in different database tables stored in the database 110. When the DDL query view 106 is executed then the data 108 corresponding to the DDL query view 106 is retrieved from the database 110. A DDL query view 106 is a modified view of query. A query view may contain a section or a navigational state of query. For example, consider an initial query view that includes three fields: employee name, address, and employee identification number, of a database table. A user may change this query view to include another field employee age in the modified view of the query. In case the query is executed the next time it will include data values from the fields: employee name, address, employee identification number, and employee age.

In one embodiment, additional application metadata may be included in the DDL query view 106. The additional information may include, for example, hierarchical information about the different entities in the database, metadata related to different user interface aspects (for example, user defined labels on different portions of the user interface), etc. The DDL query view 106 may be executed to generate run time database objects. A database object is a data structure used to either store or reference data. The database objects may include, for example, a query view corresponding to the query view definition included in the DDL query view 106. In one embodiment, the DDL query view 106 may be, for example, SAP HANA® Core Data Service (CDS) query view.

The DDL query view 106 also includes a definition of data transfer service 112 defined to transfer data 108 from the database 110 to the application 102. The data transfer service 112 may be, for example, an Open Data Protocol (Odata) service. The data transfer service 112 may be generated when the DDL query view is executed. Table 1 illustrates a portion of an exemplary DDL query view that includes an OData service definition, a user interface metadata (@Endusertext_Label), and a filter (@Consumption-.filter) that may be included in the application 102. The data transfer service 112 and the DDL query view 106 may be included in a database server 114.

TABLE 1

```
//Data transfer service definition
@Odatapublish:true
define view C_employee planning query with parameters
parameter_EmployeeHierarchy : String
as Select from I_PeopleResourcePlanning View
{
//filters
@Consumption.filter { selection type: #single, multipleSelections : false,
mandatory : True}
I_CostCenterPlanningView.CompanyCode;
//UserInterface Metadata
@Endusertext.Label = 'Employee'
@AnalyticsDetails : {query: (axis : #Rows, resultValueSource:
#Dimension}
I_PeopleSurveyPlanningView.Employee
```

The application generator 104 may then generate an application page template 116 that defines a user interface for the application 102. The application page template 116 may define a customized UI for the application 102 that is to be generated. The application page template 116 may be determined based on the user interface metadata 118 included in the DDL query view 106, user interface related rules included in the application generator 104, and pre-defined user interface templates stored in the application generator 104. The pre-defined user interface template includes a combination of user interface (UI) patterns arranged in a specific order that allows a user to accomplish a certain activity. For example, when the user interface is defined for performing a search operation then the pre-defined user interface pattern may be defined to include a search tab on a top portion of the user interface and a search result section below the tab to show the search results.

The user interface metadata may include user interface definition specific to the application 102. For example, when the application 102 is an employee salary planning application, then the user interface metadata may define that a label "employee" is to be displayed at the user interface to represent the list of employees. The user interface related rules may define placement of different user interface elements at a position specified by the rule.

The data transfer service 112 may forward the retrieved data 108 to the application generator 104. The application generator 104 then binds 120 the retrieved data 108 with the generated application page template 116 to obtain an application 102. Binding 120 is the process that establishes a connection between the application page template 116 and the retrieved data 108. In one embodiment, binding may include positioning the retrieved data 108 at the application page template 116 to obtain the application 102. The data 108 may be positioned at different positions of the user interface based on the binding 120. For example, a retrieved employee data may be positioned below the employee label at the application page template 116.

Finally the obtained application 102 is rendered at the user interface. Generating application page template based on pre-defined user interface templates and application generation rules provides a consistent user interface for different applications. Further binding these template with data generated from the DDL query view 106, at run time, reduces the total time for generating the application 102.

Figure 2:
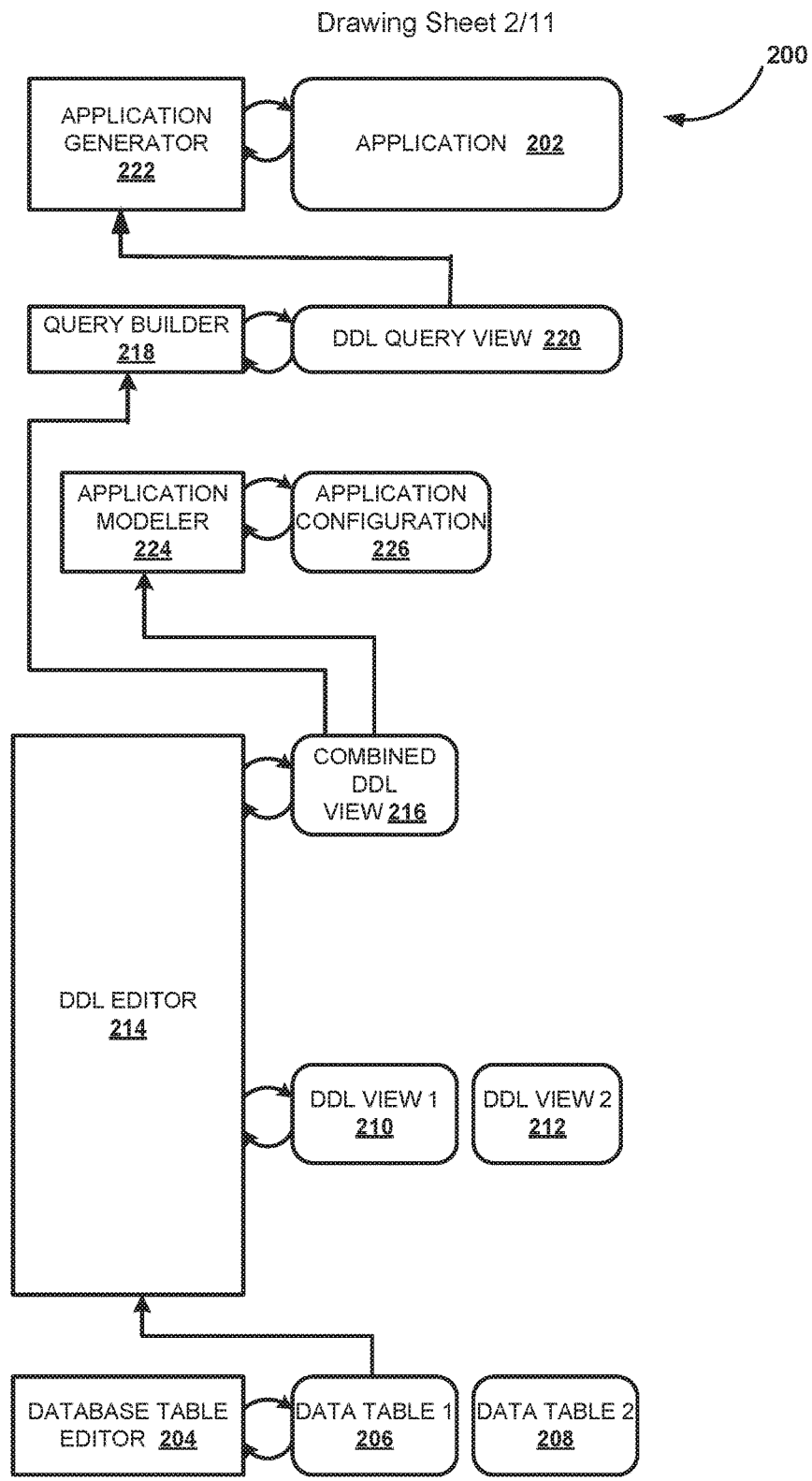
FIG. 2 is a block diagram illustrating a system for generating an application, according to an embodiment.

FIG. 2 is a block diagram illustrating a system 200 for generating an application 202, according to an embodiment. The system 200 may include a database table editor 204 that allows a user to enter or modify data tables, for example, data table 1 206 and data table 2 208, and then define data models on data tables stored in a database. The database table editor 204 may allow generation and modification of any number of data tables. The definition of the data model may include, for example, entity types, attributes, relationships, etc. of data stored in the data tables. For example, table 2 illustrates a definition of a data model corresponding to a database table storing street address and country address in DDL syntax.

TABLE 2

```
Namespace com.acme.myapp1 ;
   ©Schema : 'MYSCHEMA'
   Context MyEntity2 {
   type StreetAddress {
          name: String(80);
          number : Integer;
   };
   type CountryAddress {
          name : String(80);
          code : String(3);
   };
   @Catalog.tableType : #COLUMN
   entity Address {
          key id : Integer;
          street : StreetAddress;
          zipCode : Integer;
          city : String(80);
          country : CountryAddress;
          type : String(10); // home, office
   };
};
```

Next DDL views, for example a DDL view 1 (210) and DDL view 2 (212), are received at the DDL editor 214 from a user. The DDL view 1 (210) and DDL view 2 (212) may be received based on the definition of the data model, for example data models of data table 1 206 and data table 2 208, respectively. For example, when the database stores a plan data table storing planning data related to a project and an actual data table storing actual data related to a project then a planning DDL view and an actual DDL view corresponding to the data models of plan data table and the actual data table, respectively, may be defined. In one embodiment, DDL view is a projection of one of the data model entities included in the definition of a data model. In one embodiment, the DDL view may not be persisted in the database. Table 3 illustrates a DDL view that may be generated for the address entity included in the data model definition shown in Table 2.

TABLE 3

```
view AddressView as select from Address
    {
      id,
      street.name,
      street.number
    };
```

In one embodiment, the different DDL views, for example, DDL view 1 (210) and DDL view 2 (212), are merged to obtain a combined DDL view 216. The combined DDL view 216 may be annotated to indicate properties of the different DDL views included in the combined DDL view file. For example consider two DDL views, an actual data DDL view and a plan data DDL view, corresponding to database tables storing actual data, which is read-only, and plan data, which is read-write only, respectively. The combined DDL view, obtained by merging the two views may be annotated to indicate that the DDL view corresponding to actual data is read only and the DDL view corresponding to plan data is read-write enabled.

In one embodiment, the annotations in the combined DDL view 216 are provided in a format readable by a transient data provider interface. A data provider transfers the database views during the processing of request at the application. The data provider, for example an Operational Data Provider (ODP) provided by SAP®, defines a data transfer interface for different types of data. In one embodiment, the data transfer interface implements the transfer of data. The data provider is not persisted in the database. In this case, a definition of data provider is received at design time and based on the definition the data provider may be generated and implemented at runtime.

A query builder 218 is then used for modifying the combined DDL view 216 to obtain a DDL query view 220. The DDL query view 220 may be obtained by modifying the combined DDL view 216 to define the DDL query view 220 for a particular navigational state of a query. A query view is a modified view of data for a query. A query view contains a section or a navigational state of a query. For example, consider that the result of a query is stored as an initial query view. A user may navigate, for example by performing a drilldown operation, from the initial query view to obtain another data. The view corresponding to the obtained data, which is a navigational state of the query, is stored as a query view for the query.

In one embodiment, the data provider interface is defined to interpret the DDL query view 220 as a transient aggregation level. An aggregation level is defined by a set of characteristics and key figures included in a data model. The key figures contained in the aggregation level are aggregated using the characteristics excluded in the aggregation level. For example, Table 4 illustrates definition of a data model that includes characteristics: product, product group, version and year, and the key figure revenue.

TABLE 4

| Product | Product Group | Version | Year | Revenue |
|---------|---------------|---------|------|---------|
| P1 | PG1 | V1 | 2005 | 10 |
| P2 | PG1 | V1 | 2005 | 20 |
| P3 | PG2 | V1 | 2005 | 42 |

An aggregation level (ALVL) may be determined for the database table 4 by applying a planning function "SUM" on the key figure "Revenue" to aggregate the revenue using the characteristic "Product" that is to be excluded from the ALVL. Table 5 illustrates the ALVL obtained after applying the planning function "SUM".

TABLE 5

| Product Group | Version | Year | Revenue |
|---------------|---------|------|---------|
| PG1 | V1 | 2005 | 30 |
| PG2 | V1 | 2005 | 42 |

In one embodiment, the DDL query view 220 includes a data transfer service definition, for example an Odata (Open data protocol) service definition. Based on the data transfer service definition, a data transfer service may be generated when the query view is executed. The data transfer service may transfer data from the database to the application. The data transfer service may also expose different database views to the application. Database views exposed by the data transfer service may be available for analysis and display at the application 202. The data transfer service definition may also allow a user to perform data modification operations, for example create, update or delete operation, on the data stored at the database.

The obtained DDL query view 220 may then be provided to an application generator 222 that binds the application page template with the data obtained after executing the DDL query view to generate the application 202. The system 200 may also include an application modeler 224 that allows a user to define application configuration 226 for configuring an application 202. The application configuration 226, for example different planning configurations, may define the steps or sub-steps that are to be included in the application 202 with respect to a particular operation. The application configuration 226 may also define a context area in which information related to a particular sub-step is displayed.

Figure 3A:
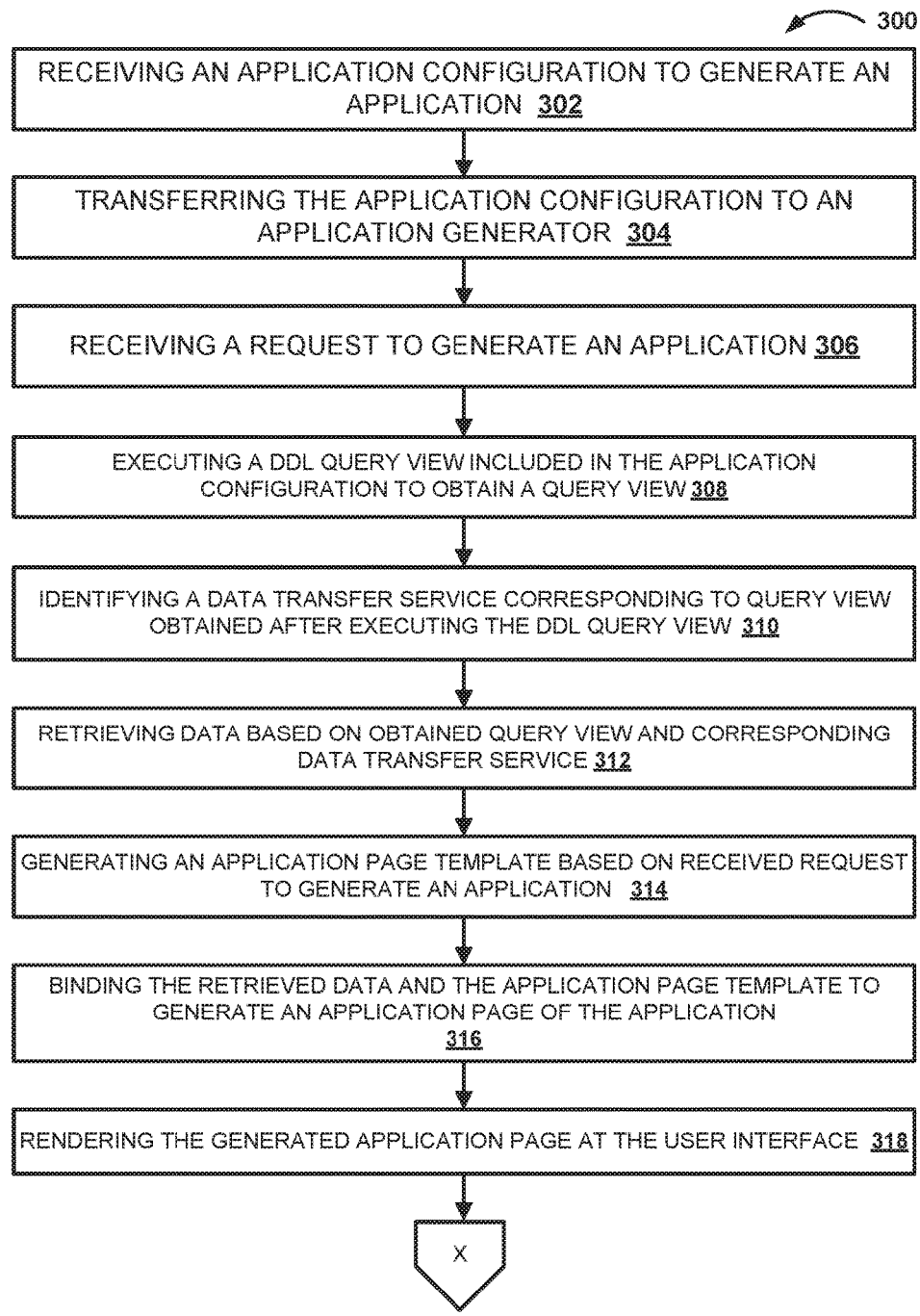
FIGS. 3A-3B is a flow diagram illustrating a process for generating an application, according to an embodiment.
Figure 3B:
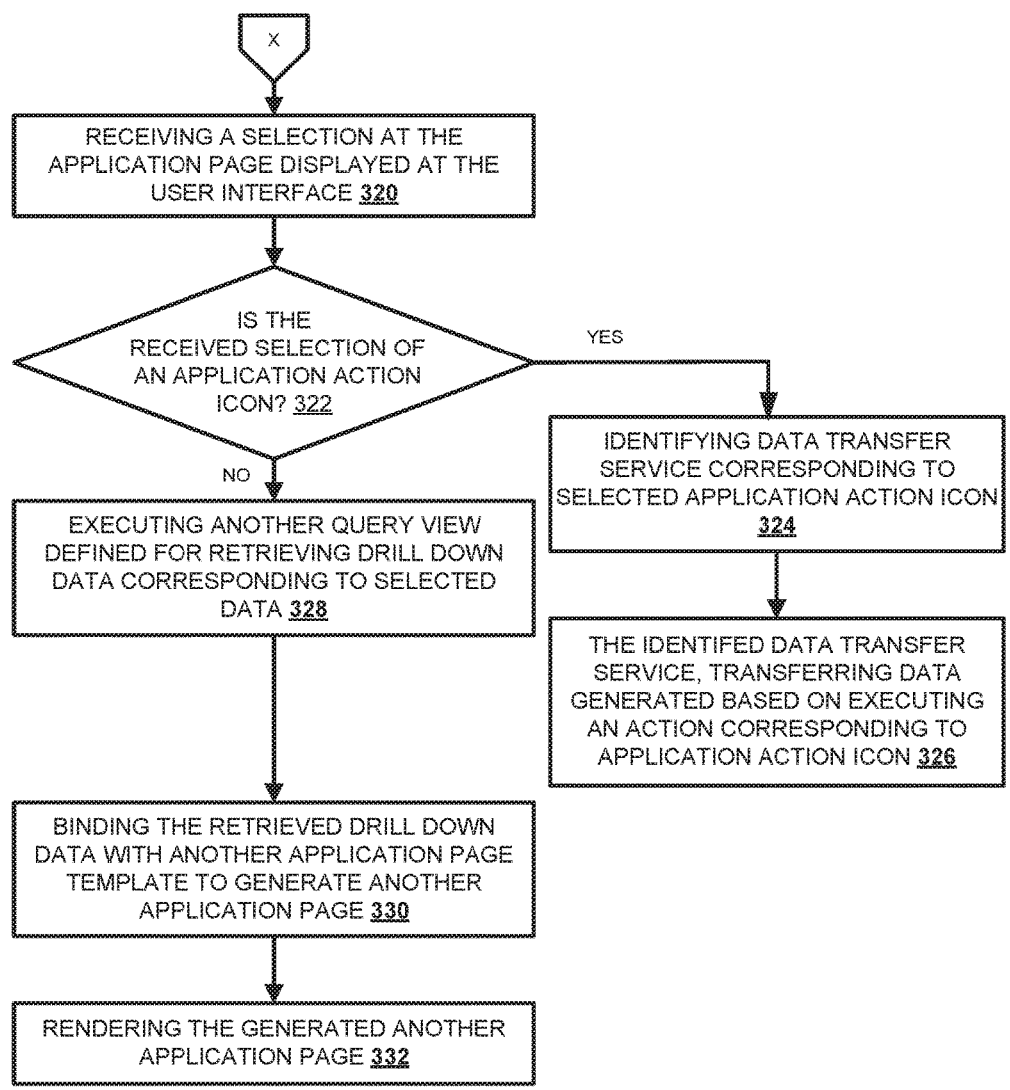

FIG. 3 is a flow diagram illustrating a process 300 for generating an application, according to an embodiment. For generating the application, initially an application configuration is received to generate an application (302). The application configuration may be received, from a user, at an application configuration application. An application configuration may include a DDL query view for generating an application. A DDL query view may define a query view to retrieve data for the application. The application configuration may also include a list of application actions that are defined to execute an action when a particular application action is selected. An application action may include, for example, a "Save" action that is defined to save the data received at the user interface of the application.

The application configuration also includes a data transfer service mapping that may be defined to map the DDL query view and the application actions to data transfer services. A data transfer service mapping may define a communication between the database and the user interface of the application. The data transfer service may be defined corresponding to a DDL query view to expose the DDL query view to the application generator and to transfer data corresponding to the DDL query view to a user interface of the application. In one embodiment, the data transfer service is an OData service. OData service exposes an end point that allows an application to access data. OData services implement the OData protocol to map data in one format (e.g., database tables, spreadsheet lists, etc.) to another format that is understandable by a client requesting the data.

The data transfer service mapping may also be received for the different application actions that are to be included in the application. An application action defines a particular action that is to be performed when an application action icon on the user interface (UI) of the application is selected. For example, an application action "Save" may be defined to store data values received at the user interface, of the application, to the database. The application action may be mapped to a particular application transfer service that may transfer a data, which is to be saved, to the database when the application action icon "Save" is selected. In one embodiment, the user may be provided an application configuration page on the user interface that allows a user to provide the configuration data.

Next the received application configuration is transferred to the application generator (304). As discussed above, an application generator generates application based on UI related information and data stored in the database. After the application configuration is transferred, a request may be received at the user interface for generating the application (306). The user interface may present several options for generating different type of applications. In one embodiment, the user interface may display options to perform several activities and an application may be generated corresponding to the selected activity. For example, the user interface may display options to plan human resources for a project, manage employee data, approve employee hiring, etc. A user may choose, for example, an activity to plan human resources. Based on this selection, an application may be generated for planning human resources.

Next a DDL query view included in the application configuration is executed to obtain a query view (308). The DDL query view may be executed by the application generator. Executing the DDL query view generates database objects, for example query views, tables, etc., and data transfer services defined in the DDL query view. For example, when the human resource planning is selected for generating an application then a "human resource planning" query view defined to retrieve human resource related data from the database is generated by executing the DDL query view.

Next the data transfer service corresponding to the query view obtained after executing the DDL query view is identified (310). The data service mapping included in the application configuration is used to identify the data transfer service corresponding to the query view. The data transfer service may be one of the data transfer services generated after executing the identified DDL query view. The determined data transfer service may then retrieve the data from the database based on the obtained query view. For example, when the determined data transfer service is a "human resource" Odata service then this service may retrieve employee name, designation, department based on the "human resource planning" query view. The Odata service may provide the retrieved data to the application generator.

In one embodiment, the DDL query view and the data transfer service may allow a user to perform manual or automatic planning. Planning is a process of determining a future demand of an entity, for example product, material, etc., based on existing demand and supply of the entity. For performing the planning operation, the DDL query view may be interpreted as a transient aggregation level by the data provider providing data to the data transfer service. In case of manual planning the DDL query view interpreted as aggregation level allows generation of input ready query. An input ready query allows a user to provide input for some of the attributes in a database table, at run time. For example, consider a database table includes three attributes: product name, actual data, and plan data. An aggregation level maybe defined with characteristic "product name" attribute and key figure attributes "plan data" and "actual data". The properties of the key figure attributes "plan data" and "actual data" may then be defined as input ready and not input ready, respectively. Based on this definition, the planning application may allow a user to enter data values for "plan data" attribute, which is defined as input ready, at run time.

In case of automated planning the aggregation level allows generation of planning functions for performing a planning operation. Planning functions are used for system-supported editing and generation of data. For example, the planning function may include a copy function, a repost function, a delete function, etc. To generate the planning function, some of the characteristics included in the aggregation level may be identified as key figures. The planning function may then be applied to the values corresponding to the identified key figures. For example, table 6 illustrates an aggregation level for sales of product PG1 in 2016.

TABLE 6

| Product | Product Group | Version | Year | Sales |
|---------|---------------|---------|------|-------|
| P1      | PG1           | V1      | 2016 | 10    |
| P2      | PG1           | V1      | 2016 | 20    |

The characteristics product, product group, year, and sales of the Table 6 may be identified as the key figures of the aggregation level. A request may be received at the planning application to apply a planning function "repost" on the aggregation level to repost this information from version "V1" to "V2". When the planning function "repost" is applied then the record in V1 may be reposted to V2. Table 7 illustrates the table obtained after reposting data from V1 to V2.

TABLE 7

| Product | Product Group | Version | Year | Revenue |
|---------|---------------|---------|------|---------|
| P1      | PG1           | V1      | 2007 | 0       |
| P2      | PG1           | V1      | 2007 | 0       |
| P1      | PG1           | V2      | 2007 | 10      |
| P2      | PG1           | V2      | 2007 | 20      |

Next data is retrieved based on the obtained query view at 308 and the corresponding data transfer service identified at 310 (312). A DDL query view file may be executed to obtain several query views. A query view related to a particular navigational state may be used to retrieve data for the application. For example, when an application is to be generated for an employee data then an "employee all" query view may be initially executed that retrieves the employee name and identification of all the employees in company X. When a user clicks on one of the employee name then another query view that retrieves employee name, department, employee contact information, etc.

Next application page template are generated for the application based on the received request to generate the application at 306 (314). For generating the application page template a pre-defined user interface template may be selected corresponding to the application that is requested to be rendered. For example, consider that a selection is received to render a list of employees. In this case a pre-defined "object" view floor plan that defines a pre-defined arrangement of user interface elements to display a list may be selected. The selected pre-defined user interface template may then be modified based on the user interface metadata and user interface related rules to generate the application page template.

Next the generated application page template and the retrieved data is bound to generate an application page of the application (316). The generated application page is then rendered at the user interface (318). Rendering is the process of displaying the application page on the user interface. A selection may then be received at the application page rendered at the user interface (320). The selection may be received from a user viewing the application page on the user interface. Next a determination is made that whether the selection received at application page in 320 is of an application action icon displayed at the application page (322). In case the selection is of the application action icon (condition in 322 is true) then the data transfer service corresponding to the selected application action icon is identified (324). The data transfer service corresponding to the application action icon is identified from the data transfer service mapping included in the application configuration. The identified data transfer service may then transfer, to the database, the data generated based on executing an action corresponding to the application action icon (326). For example, when the application control button selected on the application page template is a "Save" button then a "save" Odata service stored corresponding to the "Save" button in the data service mapping may be identified. The "save" Odata service then sends an input received on the application page to the database for storing the received data.

In case the selection received is not of an application action icon (condition in 322 is false) then the selection may be of a data displayed at the application page. In one embodiment, the selection may be a request to retrieve drill down data with respect to the data selected on the application page. In this case the application generator executes another query view defined for retrieving drill down data corresponding to the selected data (328). For example, when the selected data element is a data value € 15,000 that corresponds to "Sales in Europe" field then a query view may be defined to retrieve data values corresponding to "France", "Germany" and "UK" from the database based on the selection. The retrieved drill down data is then bound to another application page template to generate another application page (330). In one embodiment, the application generator manages a stack of pre-defined user interface templates to display hierarchical data. The stack of pre-defined user interface templates may include, for example, an object view floor plan to display the initial page of data and a list view floor plan to display detailed drill down data. The generated another application page is rendered at the user interface (332).

Figure 4:
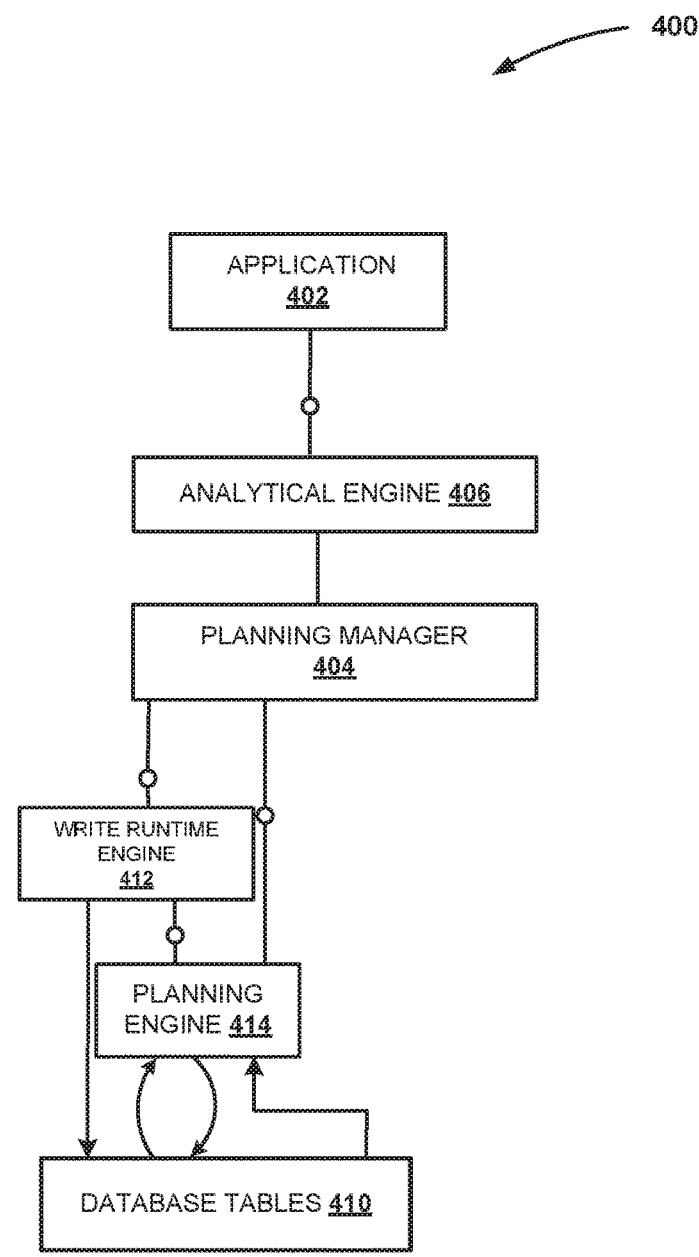
FIG. 4 is a block diagram illustrating an exemplary system to execute a planning operation for an application 402, according to an embodiment.

FIG. 4 is a block diagram illustrating an exemplary system 400 to execute a planning operation for an application 402, according to an embodiment. As discussed above, the planning operation may include manual planning and automatic planning on data included in the application. A planning manager 404 may manage execution of planning operations received as a request from a user at the application 402. The request may be transmitted to the planning manager 404 from an analytical engine 406. An analytical engine 406 provides online analytical programming (OLAP) functions and services, as well as services for planning and analysis.

For performing a planning operation, the planning manager 404 may read a query view transferred from the application 402 by an Odata service 408, via the analytical engine 406. In one embodiment, the query view may be read as an aggregation level by the planning manager 404. The aggregation level may provide information about the fields of database tables 410 that are input ready (for manual planning) or fields of the database tables 410 on which the planning functions may be applied (for automated planning). Based on the aggregation level data, the data received at the application are transferred to the database tables by the write runtime engine 412.

In case of automatic planning, when a planning function is defined for data fields displayed at the application 402 then the planning manager 404 triggers a planning engine 414 to execute the planning functions as a transformation of source data into a result. The obtained result is then transferred by the write runtime engine 412 to the database tables 410, which is updated by the obtained result.

Figure 5:
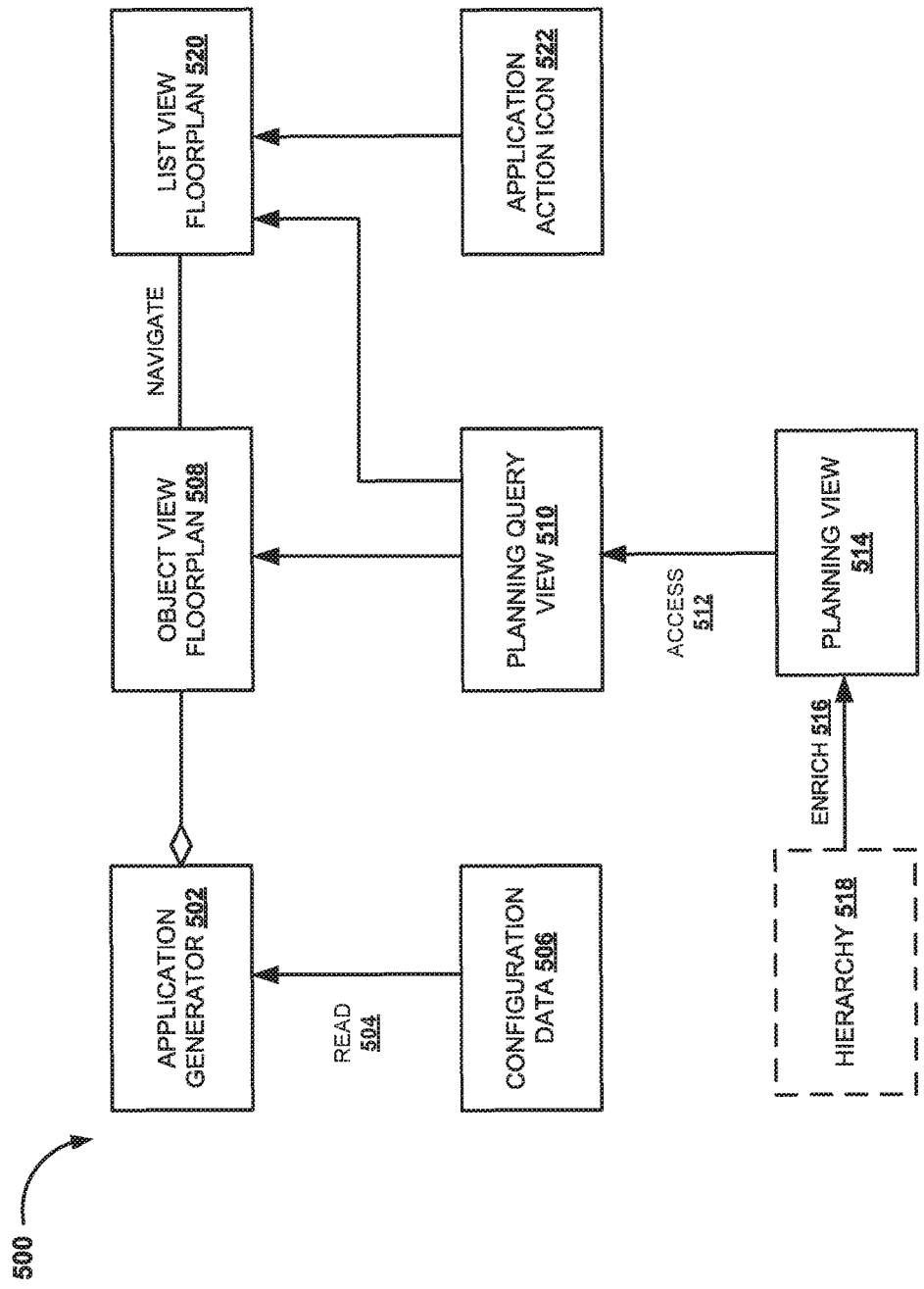
FIG. 5 is an exemplary block diagram illustrating a process to generate a planning application, according to an embodiment.

FIG. 5 is an exemplary block diagram illustrating a process 500 to generate a planning application, according to an embodiment. In one embodiment, a planning application is generated based on actual data values of a project and a plan data, which is a predicted data value for a future time period derived based on the actual data values. For generating the planning application, initially an application generator 502 reads 504 configuration data 506 that includes different query views, data transfer service mapping information, and other information related to generation of the planning application. The application generator 502 then binds an object view floorplan 508 to a planning query view 510 based on the data transfer service mapping information. The planning query view 510 then access 512 a planning view 514 to retrieve actual data that is to be displayed on the object view floorplan 508. In one embodiment, the object view floorplan 508 is modified based on the user interface metadata and user interface related rules. A user may enrich 516 the planning view 514, in DDL format, with hierarchy information 518 that the application generator 502 reads for displaying hierarchical data when a drill down request is received.

Next when a selection is received for a data element at the object view floorplan 508 then the application generator 502 may display the details of the selected data element on a list view floorplan 520. The list view floorplan 520 may be defined to support input ready columns in the database table that may receive data from a user. The list view floorplan 520 may also be defined to support an application action icon 522 for example, Save and Copy such that the actions corresponding to these application action icon may be triggered when a user selects these application action icons.

FIG. 6 illustrates an exemplary user interface 600 to receive application configuration information for a cost center planning application, according to an embodiment. The cost center planning configuration defines a query view 602 (Cost Center Plan Query 604) and application actions ("Save", "Copy", and "Simulate"). The cost center planning configuration also includes a data transfer service mapping to map the query view and the application actions to different data transfer services that are defined to transfer data, corresponding to the query view or the action, to the database. For example, a data transfer service (CostCenterPlanQuery_Service 612) is defined corresponding to the query view (Cost Center Plan Query 604) that exposes the query view to the application and transfers the data corresponding to the query view to the application. Similarly data transfer services, "SavePlanValues_Service" 614, "CopyActualValues_Service" 616 and "SimulatePlanValues_Service" 618 are mapped to the application actions "Save" 606, "Copy" 608, and "Simulate" 610, respectively.

Figure 7:
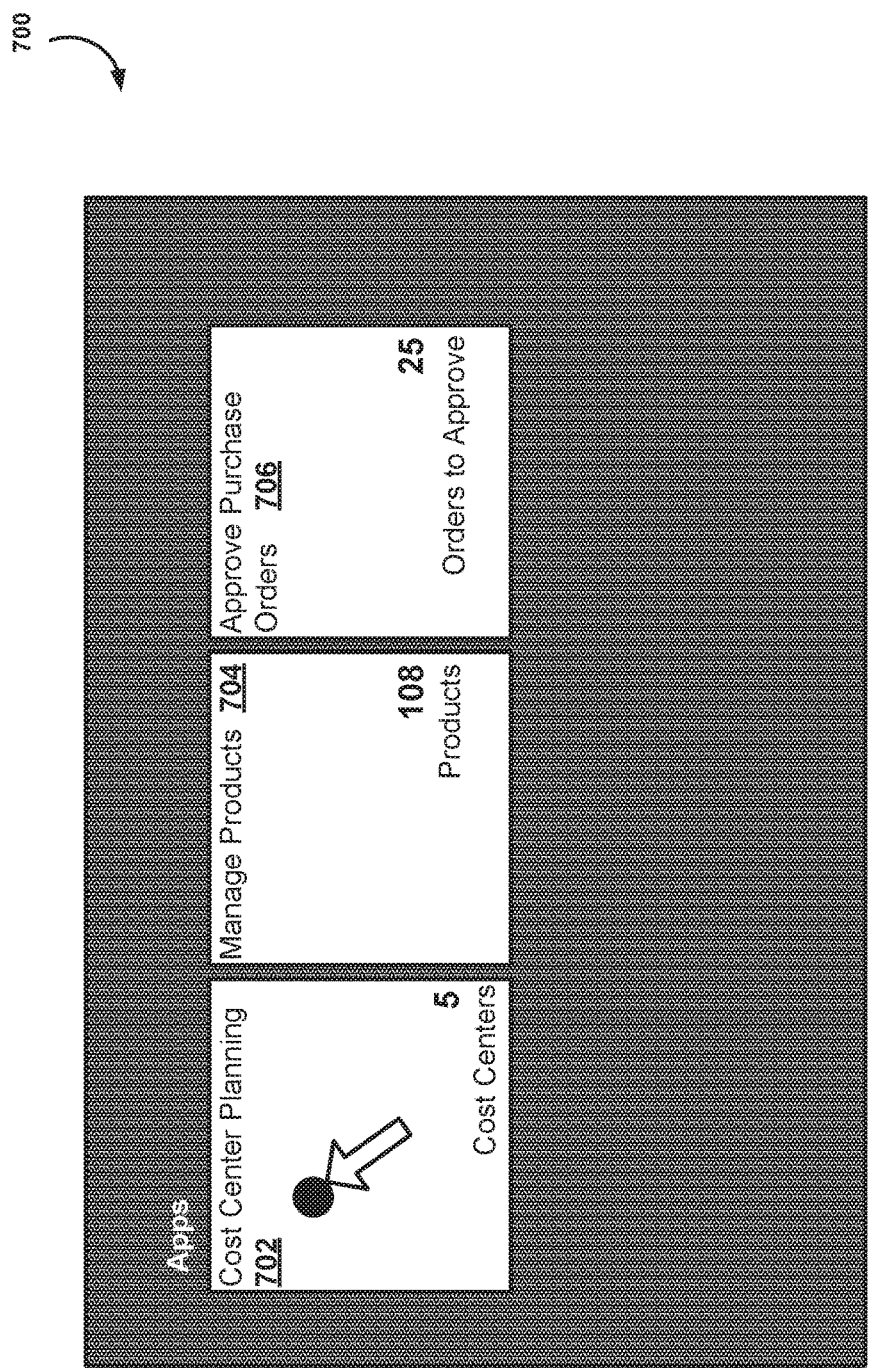
FIG. 7 illustrates an exemplary user interface displaying an application launch page generated based on the cost center planning configuration received in FIG. 6, according to an embodiment.

FIG. 7 illustrates an exemplary user interface 700 displaying an application launch page 700 generated based on the cost center planning configuration received in FIG. 6, according to an embodiment. The application launch page 700 may display the different activities for which the application may be generated. As shown, the user is provided options to generate an application for "cost center planning" 702, "manage products" 704, and "approve purchase orders" 706 activities. The user may select a "cost center planning" activity to generate the application. Once the user selects the "cost center planning" 702 activity to generate the application then the planning query "CostCenterPlan_Query" 604, of FIG. 6, in DDL view is executed to generate the corresponding data transfer service "CostCenterPlanQuery_Service" 612 and a query view defined by the "CostCenterPlan_Query" 604. The generated data transfer service then retrieves the list of cost centers for which a planning is to be performed based on the data transfer service "CostCenterPlanQuery_Service" 612.

Figure 8:
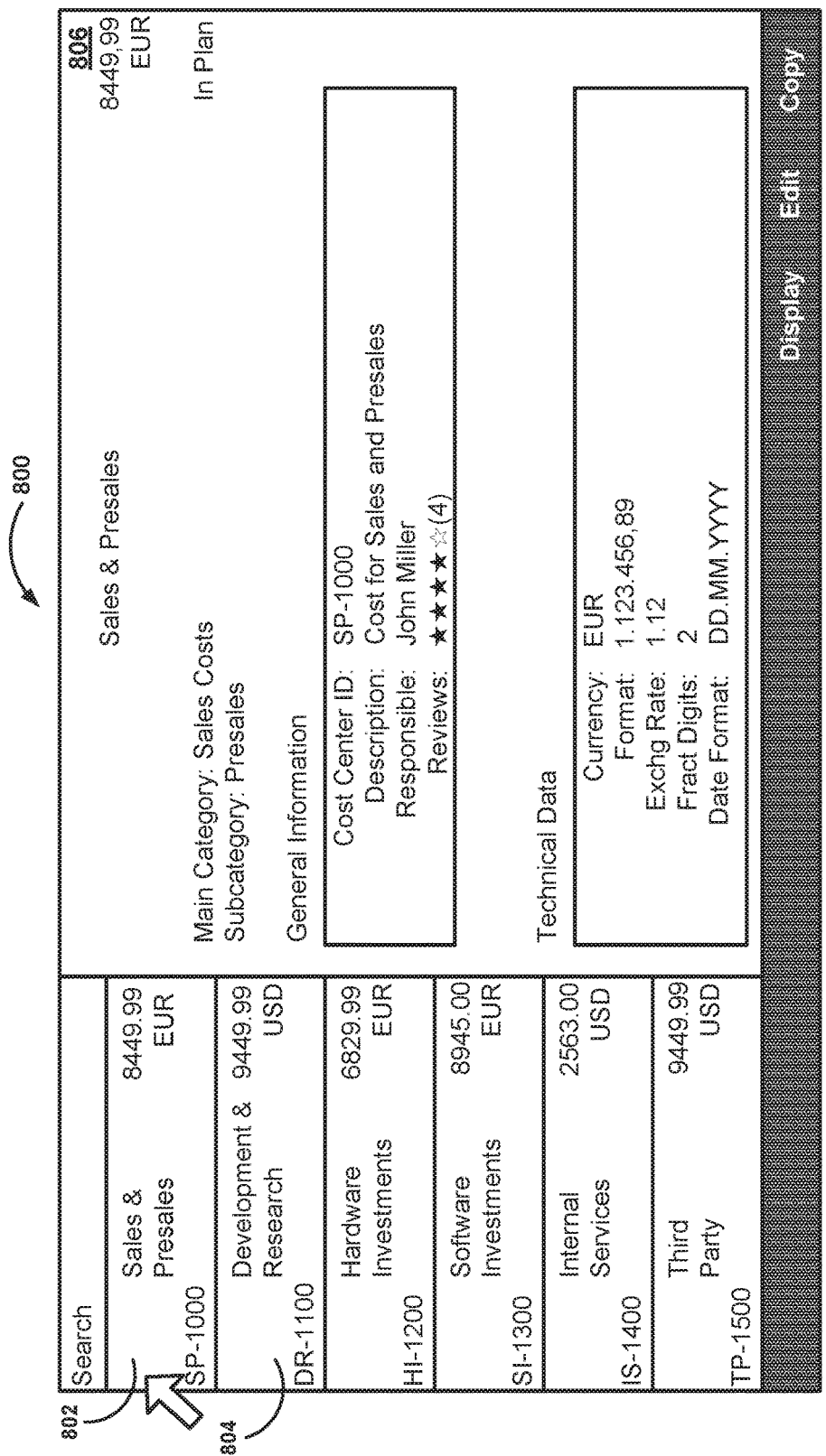
FIG. 8 illustrates an exemplary user interface 800 displaying a cost center details page based on the cost center planning selection received in FIG. 7, according to an embodiment.

FIG. 8 illustrates an exemplary user interface 800 displaying a cost center details page based on the cost center planning selection received in FIG. 7, according to an embodiment. The cost center details page including a list of cost centers "Sales and Presales" 802, "Development and research" 804, etc. A selection may be received for one of the cost centers "Sales and Presales" 802. The selected "Sales and Presales" 802 may be a cost center for which the user wants to perform a planning operation. The user interface 800 may display details 806 of the selected cost center "Sales and Presales".

FIG. 9 illustrates an exemplary user interface 900 displaying details of the sales and presales cost center selected in FIG. 8, according to an embodiment. An application generator may execute a query view that retrieves data related to the fields, account 902, description 904, "Total Actual 2016" 906, and status 908 from the database. The DDL query view may also define the field "Total Plan 2016" 910 as input ready that may receive data for the "Total Plan 2016" field, at runtime. A "difference" 912 field may also be defined that displays a difference of value between the "Total Actual 2016" 906 and the received data for "Total Plan 2016" 910. The DDL query view may also define filters "Company Code" 914, "Fiscal Year" 916 and "Planning Version" 918, which allows a user to select data based on selecting filter values for these fields when a "SEARCH" icon 920 is selected. Application action icons "Copy" 922, "Simulate" 924 and "Save" 926 may also be defined that perform a pre-defined action, for example, copy data from one column to another column, simulating data based on received plan data, and saving data received at the application, respectively, based on received selection from user.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape: optical media such as CD-ROMs, DVDs and holographic devices; magneto-optical media: and hardware devices that are specially configured to store and execute, such as application-specific integrated circuits (ASICs), programmable logic devices (PLDs) and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 10:
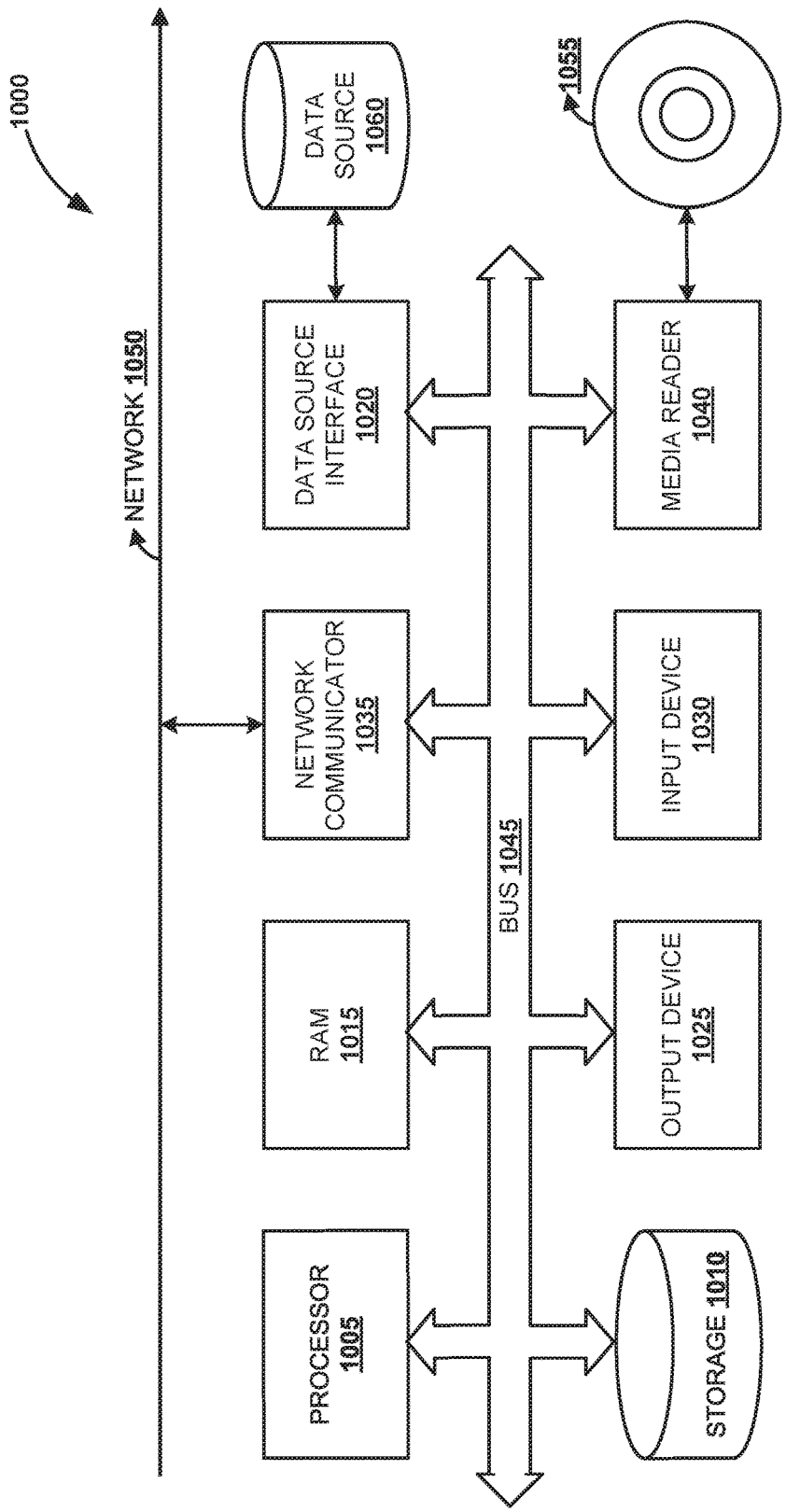
FIG. 10 is a block diagram illustrating an exemplary computer system to generate an application based on DDL query view and application page template, according to one embodiment.

FIG. 10 is a block diagram of an exemplary computer system 1000. The computer system 1000 includes a processor 1005 that executes software instructions or code stored on a computer readable storage medium 1055 to perform the above-illustrated methods. The computer system 1000 includes a media reader 1040 to read the instructions from the computer readable storage medium 1055 and store the instructions in storage 1010 or in random access memory (RAM) 1015. The storage 1010 provides a large space for keeping static data where at least some instructions could be stored for later execution. The stored instructions may be further compiled to generate other representations of the instructions and dynamically stored in the RAM 1015. The processor 1005 reads instructions from the RAM 1015 and performs actions as instructed. According to one embodiment, the computer system 1000 further includes an output device 1025 (e.g., a display) to provide at least some of the results of the execution as output including, but not limited to, visual information to users and an input device 1030 to provide a user or another device with means for entering data and/or otherwise interact with the computer system 1000. Each of these output devices 1025 and input devices 1030 could be joined by one or more additional peripherals to further expand the capabilities of the computer system 1000. A network communicator 1035 may be provided to connect the computer system 1000 to a network 1050 and in turn to other devices connected to the network 1050 including other clients, servers, data stores, and interfaces, for instance. The modules of the computer system 1000 are interconnected via a bus 1045. Computer system 1000 includes a data source interface 1020 to access data source 1060. The data source 1060 can be accessed via one or more abstraction layers implemented in hardware or software. For example, the data source 1060 may be accessed by network 1050. In some embodiments the data source 1060 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

What is claimed is:

1. A non-transitory computer-readable medium to store instructions, which when executed by a computer, cause the computer to perform operations comprising:
   receive an application configuration, wherein the application configuration is retrieved from a user at an application configuration application, wherein the application configuration comprises a Data Definition Language (DDL) query view, and wherein the DDL query view is obtained by modifying a combined DDL view to define the DDL query view for a navigational state of a query;
   transfer the application configuration to an application generator;
   receive, at an user interface, a request to generate an application;
   execute, based on the received request and by the application generator, the DDL query view comprised in the application configuration to obtain a query view and a data transfer service, wherein the DDL query view comprises a definition of at least one data transfer service defined to transfer data from a database to the application;
   retrieve, from a database, data based on the query view and the data transfer service;
   generate, based on the received request, an application page template including a plurality of user interface (UI) related elements of the application; and
   bind the application page template and the retrieved data to generate a plurality of application pages of the application, and render the application pages on the user interface.

2. The computer-readable medium of claim 1, further comprising instructions which when executed by the computer further causes the computer to:
   receive a selection on an application page from the plurality of application pages;
   when the received selection is of an application action icon included in the application page, identify a data transfer service corresponding to an application action icon;
   execute an action corresponding to the application action icon to generate data; and
   transfer the data, generated based on executing the action to the database, by the identified data transfer service.

3. The computer-readable medium of claim 1, further comprising instructions which when executed by the computer further causes the computer to:
   receive a selection on an application page from the plurality of application pages;
   when the received selection is of data included in the application page, execute another query view to retrieve drill down data corresponding to the selected data;
   bind the retrieved drill down data with another application page template to generate another application page; and
   render the generated another application page.

4. The computer-readable medium of claim 1, further comprising instructions which when executed by the computer further causes the computer to:
   receive an application configuration, wherein receiving the application configuration includes:
      receiving a DDL query view and corresponding data transfer service, and plurality of application action icons and corresponding data transfer services defined for the application.

5. The computer-readable medium of claim 1, further comprising instructions which when executed by the computer further causes the computer to:
   receive the DDL query view including definition of the query view, one or more filters, and metadata related to the application, wherein the metadata includes hierarchical information related to data.

6. The computer-readable medium of claim 5, further comprising instructions which when executed by the computer further causes the computer to:
   navigate between a first application page from the plurality of application pages and a second application page from the plurality of application pages based on the hierarchical information included in the DDL query view.

7. The computer-readable medium of claim 1, further comprising instructions which when executed by the computer further causes the computer to:
   render the generated application page at the user interface.

8. A computer-implemented method to generate an application, the method comprising:
   receive an application configuration, wherein the application configuration is retrieved from a user at an application configuration application, wherein the application configuration comprises a Data Definition Language (DDL) query view, and wherein the DDL query view is obtained by modifying a combined DDL view to define the DDL query view for a navigational state of a query;

transfer the application configuration to an application generator;
receive, at an user interface, a request to generate an application;
execute, based on the received request and by the application generator, the DDL query view comprised in the application configuration to obtain a query view and a data transfer service, wherein the DDL query view comprises a definition of at least one data transfer service defined to transfer data from a database to the application;
retrieve, from a database, data based on the query view and the data transfer service;
generate, based on the received request, an application page template including a plurality of user interface (UI) related elements of the application; and
bind the application page template and the retrieved data to generate a plurality of application pages of the application, and render the application pages on the user interface.

9. The computer implemented method of claim 8, further comprising:
receiving a selection on an application page from the plurality of application pages;
when the received selection is of an application action icon included in the application page, identifying a data transfer service corresponding to the application action icon;
executing an action corresponding to the application action icon to generate data; and
transferring the data, generated based on executing the action to the database, by the identified data transfer service.

10. The computer implemented method of claim 8, further comprising:
receiving a selection on an application page from the plurality of application pages;
when the received selection is of data included in the application page, executing another query view to retrieve drill down data corresponding to the selected data;
binding the retrieved drill down data with another application page template to generate another application page; and
rendering the generated another application page.

11. The computer implemented method of claim 8, further comprising:
receiving an application configuration, wherein receiving the application configuration includes:
receiving a DDL query view and corresponding data transfer service, and plurality of application action icons and corresponding data transfer services defined for the application.

12. The computer implemented method of claim 8, further comprising:
receiving the DDL query view including definition of the query view, one or more filters, and metadata related to the application, wherein the metadata includes hierarchical information related to data.

13. The computer implemented method of claim 12, further comprising:
navigating between a first application page from the plurality of application pages and a second application page from the plurality of application pages based on the hierarchical information included in the DDL query view.

14. The computer implemented method of claim 8, further comprising:
rendering the generated application page at the user interface.

15. A computer system for generation of hybrid enterprise mobile applications in cloud environment, comprising:
a computer memory to store program code; and
at least one processor to execute the program code to:
receive an application configuration, wherein the application configuration is retrieved from a user at an application configuration application, wherein the application configuration comprises a Data Definition Language (DDL) query view, and wherein the DDL query view is obtained by modifying a combined DDL view to define the DDL query view for a navigational state of a query;
transfer the application configuration to an application generator;
receive, at a user interface, a request to generate an application;
execute, based on the received request and by the application generator, the DDL query view comprised in the application configuration to obtain a query view and a data transfer service, wherein the DDL query view comprises a definition of at least one data transfer service defined to transfer data from a database to the application;
retrieve, from a database, data based on the query view and the data transfer service;
select, based on the received request, a pre-defined user interface template corresponding to the application to generate an application page template including a user interface (UI) related elements of the application; and
bind the application page template and the retrieved data to generate a plurality of application pages of the application, and render the application pages on the user interface.

16. The system of claim 15, wherein the at least one processor further executes the program code to:
receive a selection on an application page from the plurality of application pages;
when the received selection is of an application action icon included in the application page, identify a data transfer service corresponding to an application action icon;
execute an action corresponding to the application action icon to generate data; and
transfer the data, generated based on executing the action to the database, by the identified data transfer service.

17. The system of claim 15, wherein the at least one processor further executes the program code to:
receive a selection on an application page from the plurality of application pages;
when the received selection is of data included in the application page, execute another query view to retrieve drill down data corresponding to the selected data;
bind the retrieved drill down data with another application page template to generate another application page; and
render the generated another application page.

18. The system of claim 15, wherein the at least one processor further executes the program code to:
receive an application configuration, wherein receiving the application configuration includes:
receiving a DDL query view and corresponding data transfer service, and plurality of application action icons and corresponding data transfer services defined for the application.

19. The system of claim 15, wherein the at least one processor further executes the program code to:
receive the DDL query view including definition of the query view, one or more filters, and metadata related to the application, wherein the metadata includes hierarchical information related to data.

20. The system of claim 19, wherein the at least one processor further executes the program code to:
navigate between a first application page from the plurality of application pages and a second application page from the plurality of application pages based on the hierarchical information included in the DDL query view.

* * * * *